United States Patent [19]
Marcus et al.

[11] Patent Number: 4,857,288
[45] Date of Patent: Aug. 15, 1989

[54] ZEOLITE LZ-135 AND PROCESS FOR PREPARING SAME

[75] Inventors: Bonita K. Marcus, Rye; Brent M. Lok, New City, both of N.Y.

[73] Assignee: UOP, Des Plaines, Ill.

[21] Appl. No.: 50,017

[22] Filed: May 15, 1987

[51] Int. Cl.$^4$ .............................................. C01B 33/28
[52] U.S. Cl. ...................................................... 423/328
[58] Field of Search ............... 423/328, 329, 326, 330, 423/331, 332; 502/60, 77

[56] References Cited

U.S. PATENT DOCUMENTS

| | | | |
|---|---|---|---|
| 3,709,979 | 1/1973 | Chu | 423/328 |
| 3,947,482 | 3/1976 | Albers et al. | 423/329 |
| 4,021,447 | 3/1977 | Rubin et al. | 260/326.8 |
| 4,241,036 | 12/1980 | Flanigen et al. | 423/328 |

OTHER PUBLICATIONS

R. B. La Pierre et al., "The Framework Topology of ZSM-12: A High Silica Zeolite", *Zeolites*, vol. 5, No. 6, Nov. 1985, pp. 346–348.

*Primary Examiner*—John Doll
*Assistant Examiner*—R. Bruce Breneman
*Attorney, Agent, or Firm*—T. K. McBride

[57] ABSTRACT

Novel crystalline aluminosilicate composition denominated LZ-135 and having uniform pore diameters of approximately 4.3 Ångstroms is prepared hydrothermally from a reaction mixture containing as essential reagents, water, an alkali or alkaline earth oxide, alumina, silica and as the templating agent a mixture of the ion species tetramethylammonium ions and tetraethylammonium.

7 Claims, No Drawings

ZEOLITE LZ-135 AND PROCESS FOR PREPARING SAME

The present invention relates in general to aluminosilicate compositions and to the method for their preparation. More particularly the invention relates to novel crystalline aluminosilicates of the zeolite type prepared hydrothermally from a reaction mixture comprising an alkali or an alkaline earth metal oxide, silica, alumina, water and a tetralkylammonium ion in which the alkyl groups contain from 1 to 2 carbon atoms.

In the synthesis of zeolite species, particularly those which are highly siliceous, from reaction mixtures which contain organic nitrogeneous or phosphonium bases, it has been speculated that these relatively large ionic species serve, at least in part, as templating agents which influence the topology of the crystalline zeolite product. It is apparent, however, that other factors in the synthesis process also influence the structure of the zeolite product since it is known that the same zeolite species can be produced from reaction mixtures containing quite different organic bases, and also that gels containing the same organic base can produce substantially different zeolite structures. For example, both tetraethylammonium and tetrabutylammonium ions can template the formation of zeolite ZSM-11 (U.S. Pat. No. 3,709,979), whereas tetraethylammonium ions can also template the formation of zeolite Beta (U.S. Pat. No. 3,308,069). Further, the tetramethylammonium ion is known to template the formation of zeolite Omega, as disclosed in detail in U.S. Pat. No. 4,241,036.

It has now been discovered, however, that the tetraethylammonium ion and the tetramethylammonium ion in combination, template the formation of a previously unknown zeolite composition from reaction mixtures similar to those which have heretofore been proposed for the synthesis of other distinct zeolite species. This novel zeolite composition is hereinafter denominated LZ-135.

LZ-135 has a chemical composition expressed in terms of mole ratios of oxides and the anhydrous state as:

$$xM_{2/n}O:Al_2O_3:ySiO_2$$

wherein "M" is at least one cation having the valence "n", "x" has a value of from zero to 3.5, and "y" has a value of from 3.5 to 6.5, preferably 4 to 6, said aluminosilicate having an X-ray powder diffraction pattern containing at least the d-spacings of Table I or Table II below.

Standard techniques were employed to obtain the data of Table I and all other X-ray data for LZ-135 appearing hereinafter. The radiation was the K-alpha doublet of copper, and a Geigercounter spectrometer with a strip-chart pen recorder was employed. The peak heights and their positions as a function of 2 times theta, where theta is the Bragg angle, were read from the spectrometer chart and the interplanar spacings in Angstroms corresponding to the recorded lines were determined. In accordance with the commonly accepted nomenclature of the zeolite art, the relative intensity values of the d-spacings are, in some instances hereinafter, indicated by the letters "VW", "M" and "VS" which as shorthand terms for "very weak", "medium" and "very strong".

As synthesized and in the anhydrous state, the chemical composition of LZ-135 in terms of mole ratios of oxides is $$aR_2O:bQ_2O:cM_{2/n}O:Al_2O_3:4-6.5SiO_2$$

wherein "a" has a value of from greater than zero to 0.2; "b" has a value of from greater than zero to 0.5; "c" has a value of from zero to 1.0; (a+b) has a value of at least 0.1; "R" represents the tetraethylammonium ion; "Q" represents the tetramethylammonium ion; and M represents an alkali or alkaline earth metal ion having the valence of "n". In the as-synthesized form, i.e., the post-synthesis form which has not been calcined or otherwise chemically treated to remove the organic moieties or alter the original cation population, the X-ray powder diffraction pattern of LZ-135 contains at least the d-spacings of Table I.

TABLE I

| 2θ | d,A | Relative Intensity |
|---|---|---|
| 11.1–11.4 | 7.97–7.76 | M–VS |
| 14.0–14.3 | 6.33–6.19 | M–VS |
| 21.0–21.7 | 4.23–4.10 | VW–VS |
| 23.0–23.6 | 3.87–3.77 | M–VS |
| 23.9–24.3 | 3.72–3.66 | M–VS |
| 31.0–31.4 | 2.849–2.814 | M–VS |

The organic cations of the as-synthesized zeolite are not considered to be ion-exchangable in the ordinary sense due to steric considerations of the crystal structure, the organic cations themselves and the positions occupied by these cations within the crystal lattice. These large organic cations, moreover, tend to block the pore system and prevent the normal passage of the smaller metal cation species into and out of the crystal structure by the conventional ion-exchange mechanism. It is possible, however, to thermally or chemically decompose the organic cation species as well as any occluded organic moieties to molecular or atomic fragments small enough to be removed through the pore system. The organic cations associated with $AlO_2^-$ tetrahedra can be converted by this procedure to ammonium or hydrogen cations which are ion-exchangable in the usual manner. Calcination of the as-synthesized zeolite in air at a temperature of at least 400° C., preferably 500° C. to 650° C. for one hour, is sufficient to create the organic-free decationized form. Lower temperatures and/or shorter calcination periods are required to accomplish this result if the calcination is carried out under vacuum conditions.

As will be readily apparent to those skilled in this art, the ratio of the combined organic metallic cations to framework aluminum can appear to be substantially higher in the as-synthesized form of the zeolite than stoichiometric considerations based on conventional zeolite chemistry would permit. This phenomenon is not unique to LZ-135, however, and has generally been observed in high-silica zeolites synthesized from an organic-containing system. While the exact condition of each organic and metal cationic moiety of the zeolite are not known, it can be theorized that at least some of the organic species are merely occluded in the structure, and in addition entrap alkali or alkaline earth species which are not present in association with $AlO_2^-$ tetrahedra. In any event there is no doubt that the topology of LZ-135 is essentially zeolitic.

It is further noted that upon calcination at temperatures sufficiently high to decompose the organic species present, the X-ray powder diffraction pattern of LZ-135 changes somewhat. The most notable changes appear in the intensity values for a number of d-spacings. Some shifting in line positions are also noted as well as the appearance or disappearance of one or more lines attributed to the removal of the organic species. These changes do not, however, indicate a change in the basic topology of the zeolite structure, the X-ray powder diffraction pattern of which contains at least the d-spacings set forth in Table II below:

TABLE II

| $2\theta$ | d(A) | Relative Intensity |
|---|---|---|
| 11.4 | 7.76 | VS |
| 14.3 | 6.19 | M |
| 23.0 | 3.87 | M |
| 23.6 | 3.77 | VS |
| 24.2 | 3.68 | M |
| 29.6 | 3.018 | M |

The organic-free form of the zeolite, such as prepared by the calcination of as-synthesized LZ-135 described above, either per se or after subsequent ion-exchange, has the chemical composition in the anhydrous state in terms of mole ratios or oxides $$xM_{2/n}O:Al_2O_3:ySiO_2$$

wherein "M" is an ammonium, hydrogen or metal cation having a valence of "n", "x" has a value of zero to 1.1, "y" has a value of 3.5 to 6.5, preferably 4 to 6, said zeolite having an X-ray powder diffraction pattern containing at least the d-spacings set forth in Table II, supra.

Each of the LZ-135 compositions which have been prepared and for which an X-ray powder diffraction pattern has been obtained, either as-synthesized or after calcination, have X-ray patterns essentially as shown in Table III, below:

TABLE III

| $2\theta$ | d,A | $I/I_o \times 100$ |
|---|---|---|
| 5.5–5.8 | 16.07–15.24 | 13–36 |
| 6.3–6.6 | 14.03–13.39 | 7–19 |
| 8.5–8.7 | 10.40–10.16 | 9–27 |
| 9.5–9.9 | 9.31–8.93 | 9–26 |
| 11.1–11.4 | 7.97–7.76 | 31–98 |
| 11.8–12.2 | 7.50–7.26 | 15–32 |
| 12.8–13.0 | 6.92–6.81 | 13–44 |
| 13.2–13.4 | 6.71–6.61 | 6–29 |
| 14.0–14.3 | 6.33–6.19 | 29–100 |
| 14.8–14.9 | 5.99–5.95 | 11–20 |
| 15.0–15.3 | 5.91–5.79 | 6–21 |
| 16.1–16.6 | 5.51–5.34 | 3–10 |
| 18.2–18.5 | 4.87–4.80 | 3.20 |
| 18.8–19.0 | 4.72–4.67 | 3–20 |
| 19.8 | 4.48 | 2 |
| 20.2–20.5 | 4.40–4.33 | 9–25 |
| 20.7–21.0 | 4.29–4.23 | 7–25 |
| 21.1–21.7 | 4.21–4.10 | 7–100 |
| 22.4–22.8 | 3.97–3.90 | 3–36 |
| 23.0–23.6 | 3.87–3.77 | 31–100 |
| 23.6–24.3 | 3.77–3.66 | 32–100 |
| 24.7–24.9 | 3.60–3.58 | 16–42 |
| 25.8–26.0 | 3.453–3.427 | 3–63 |
| 26.3 | 3.389 | SH |
| 26.6–26.8 | 3.351–3.326 | 10–31 |
| 28.2–28.6 | 3.164–3.121 | 31–76 |
| 28.5 | 3.132 | 31 |
| 29.1 | 3.069 | SH |
| 29.3–29.6 | 3.048–3.018 | 25–68 |
| 30.4–30.7 | 2.094–2.912 | 3–36 |
| 31.0–31.4 | 2.885–2.848 | 23–89 |

TABLE III-continued

| $2\theta$ | d,A | $I/I_o \times 100$ |
|---|---|---|
| 31.4–31.8 | 2.849–2.814 | 28–63 |
| 32.3 | 2.772 | 10 |
| 32.6–32.8 | 2.747–2.730 | 16–25 |
| 33.2–33.7 | 2.698–2.660 | 8–71 |
| 34.6–34.9 | 2.592–2.571 | 7–15 |
| 35.4–35.6 | 2.536–2.522 | 9–19 |
| 36.7–36.9 | 2.449–2.436 | 7–17 |
| 37.5–37.9 | 2.398–2.374 | 3–22 |
| 39.1–39.3 | 2.304–2.292 | 3 |
| 39.9–40.2 | 2.259–2.243 | 9–17 |
| 42.2–42.5 | 2.141–2.127 | 9–18 |
| 42.7–43.1 | 2.118–2.100 | 3–31 |
| 43.7–44.1 | 2.071–2.053 | 7–19 |
| 46.4–46.8 | 1.957–1.941 | 7–18 |
| 47.4–47.7 | 1.918–1.907 | 6–31 |
| 48.9 | 1.863 | 7 |
| 49.0–49.4 | 1.859–1.845 | 7–19 |
| 50.2–50.8 | 1.817–1.797 | 3–25 |
| 51.4–51.8 | 1.778–1.765 | 10–22 |
| 52.0–52.4 | 1.759–1.746 | 7–31 |
| 53.8–54.2 | 1.704–1.692 | 3–19 |
| 55.0–55.6 | 1.670–1.653 | 7–19 |

SH = Shoulder

Zeolite LZ-135 can be prepared hydrothermally by crystallization from a gel whose composition expressed in terms of mole ratios of oxides falls within the following ranges:

$$aR_2O:bQ_2O:cM_{2/n}O:Al_2O_3:dSiO_2:eH_2O$$

wherein "a" has a value of from 0.1 to 6; "b" has a value of from 0.1 to 6; (a+b) has a value of at least 0.4; "c" has a value of from 1.0 to 10; "d" has a value of from 4 to 6.5, "e" has a alue of from 50 to 250; "R" represents the tetraethylammonium ion; "Q" represents the tetramethylammonium ion; and "M" represents an alkali metal or alkaline earth metal cation having the valence "n". Preferably "M" represents the sodium cation.

In preparing the aqueous reaction mixture, the conventional reactants used in zeolite synthesis are suitably employed. Alumina can be obtained from activated alumina, alpha alumina, gamma alumina, boehmite, pseudo-boehmite, alumina trihydrate, aluminum hydroxide or sodium aluminate. Silica can be obtained from precipitated silica, sodium silicates, silica sol, or silica aerogel, preferably a silica sol.

Advantageously, the crystallization procedure is carried out in a sealed reactor under autogenous pressure at temperatures in the range of from about 25° C. to 200° C., preferably at 80° C. to 150° C., until the product is crystallized. The crystalline product is then filtered, washed and dried.

The method for preparing zeolite LZ-135 is illustrated by the following examples. In all of the examples described below, a standard mixing method was employed. Sodium hydroxide was added to water, the weight of which was approximately equal to the weight of the sodium hydroxide plus the weight of the sodium aluminate and was dissolved with stirring. Then sodium aluminate was added, and the mixture was heated with stirring until the solution was clear. This solution, while still warm, was added to a blender container that contained the silica source (Ludox-LS, a silica sol containing 30 wt.% SiO₂). The resulting thin gel was blended for approximately 30 seconds to assure uniformity. The organic templating agents in the form of tetramethylammonium bromide and tetraethylammonium chloride (TMABr and TEACl, respectively) were dissolved in the remainder of the water with stirring and were added to the blender. The gel was blended at high speed for 2 to 4 minutes. The final gel was then placed in a polytetrafluoroethylene container which in turn was sealed in a stainless steel pressure vessel and digested at the specified time and temperature. The solid reaction product was recovered by filtration, washed with water and dried at ambient room temperature. The LZ-135 product was identified by X-ray analysis. Identified impurity zeolites included zeolites S and Pc.

EXAMPLES 1–9

Following the mixture procedure described above, nine preparations of LZ-135 were made using the reagent proportions in grams and the crystallization conditions set forth in tabular form below:

| Example | TEABr | TMABr | NaAlO$_2$ | NAOH | SiO$_2$ | H$_2$O | Dig. Temp. (°C.) | Dig. Time (Hrs.) | Product |
|---|---|---|---|---|---|---|---|---|---|
| 1 | 164.17 | 2.14 | 18.07 | 6.95 | 78.13 | 166.1 | 150 | 24 | LZ-135,S |
| 2 | 164.27 | 2.14 | 18.07 | 6.95 | 78.13 | 166.1 | 150 | 72 | LZ-135,S |
| 3 | 82.13 | 42.7 | 18.07 | 6.95 | 78.13 | 166.1 | 100 | 72 | LZ-135,S |
| 4 | 164.27 | 2.14 | 18.07 | 6.95 | 78.13 | 166.1 | 150 | 242.5 | LZ-135,S |
| 5 | 82.13 | 42.7 | 18.07 | 6.95 | 78.13 | 166.1 | 100 | 240 | LZ-135 |
| 6 | 82.13 | 42.7 | 18.10 | 7.0 | 78.13 | 176 | 100 | 10 | LZ-135,Pc |
| 7 | 82.13 | 42.7 | 18.10 | 7.0 | 78.13 | 176 | 100 | 14 | LZ-135,Pc |
| 8 | 27.4 | 14.2 | 6.0 | 2.3 | 26.0 | 55.4 | 100 | 13 | LZ-135,Pc |
| 9 | 27.4 | 14.2 | 6.0 | 2.3 | 26.0 | 55.4 | 100 | 21 | LZ-135,Pc |

EXAMPLE 10

The as-synthesized product of Example 5 was chemically analyzed to determine the weight percent Na$_2$O, Al$_2$O$_3$, SiO$_2$, C, N, LOI (loss of ignition at 1000° C.). The results are set forth below:

| | | |
|---|---|---|
| Na$_2$O | 10.0 | (wt. %) |
| Al$_2$O$_3$ | 19.4 | (wt. %) |
| SiO$_2$ | 53.3 | (wt. %) |
| C | 3.6 | (wt. %) |
| N | 1.0 | (wt. %) |
| LOI | 16.8 | (wt. %) |
| Si/Al | 2.34 | (atomic) |
| C/N | 4.2 | (atomic) |

The anhydrous chemical composition as expressed in mole oxide ratios are as follows:

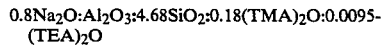

0.8Na$_2$O:Al$_2$O$_3$:4.68SiO$_2$:0.18(TMA)$_2$O:0.0095-(TEA)$_2$O

EXAMPLE 11

The product of Example 5 was calcined at 500° C. for 2 hours. The sample was then employed to determine adsorption capacities of LZ-135. The adsorption capacities were measured using a standard McBain-Bakr gravimetric adsorption apparatus on a sample activated in vacuum at 350° C.

The data for LZ-135 is set forth below:

| | Kinetic Diameter, Å | Pressure (Torr.) | Temp. (°C.) | Wt % Adsorbed |
|---|---|---|---|---|
| O$_2$ | 3.46 | 108 | −183 | 13.7 |
| O$_2$ | 3.46 | 730 | −183 | 14.7 |
| n-Hexane | 4.3 | 50 | 23.9 | 4.3 |
| n-Hexane | 4.3 | 102 | 24.0 | 5.0 |
| Iso—Butane | 5.0 | 104 | 23.7 | 0.8 |
| H$_2$O | 2.65 | 4.6 | 23.6 | 17.1 |
| H$_2$O | 2.65 | 19.5 | 23.2 | 19.6 |

From the above data, it was determined that the pore size of LZ-135 is 4.3Å.

The as-synthesized form of LZ-135 produced in Example 5, supra, was subjected to X-ray analysis. The resulting X-ray powder diffraction data is shown in Table A, below:

TABLE A

| 2θ | d,A | I/I$_o$ × 100 |
|---|---|---|
| 5.6 | 15.78 | 20 |
| 6.5 | 13.60 | 7 |
| 8.6 | 10.28 | 27 |
| 9.7 | 9.12 | 10 |
| 11.2 | 7.90 | 64 |
| 12.0 | 7.38 | 17 |
| 13.0 | 6.81 | 17 |
| 13.2 | 6.71 | 16 |
| 14.2 | 6.24 | 30 |
| 14.9 | 5.95 | 13 |
| 15.2 | 5.83 | 9 |
| 16.2 | 5.47 | 4 |
| 18.2 | 4.87 | 15 |
| 18.8 | 4.72 | 13 |
| 20.2 | 4.40 | 14 |
| 20.7 | 4.29 | 10 |
| 21.4 | 4.15 | 9 |
| 22.6 | 3.93 | 34 |
| 23.3 | 3.82 | 100 |
| 24.1 | 3.69 | 48 |
| 24.7 | 3.60 | 37 |
| 25.8 | 3.453 | 31 |
| 26.6 | 3.351 | 11 |
| 28.3 | 3.153 | 31 |
| 28.5 | 3.132 | 31 |
| 29.4 | 3.038 | 61 |
| 30.7 | 2.912 | 29 |
| 31.2 | 2.867 | 25 |
| 31.7 | 2.823 | 43 |
| 32.7 | 2.739 | 16 |
| 33.3 | 2.691 | 8 |
| 34.9 | 2.571 | 9 |
| 35.4 | 2.536 | 10 |
| 36.8 | 2.442 | 9 |
| 37.5 | 2.398 | 6 |
| 40.0 | 2.254 | 11 |
| 42.2 | 2.141 | 10 |
| 42.7 | 2.118 | 6 |
| 43.8 | 2.067 | 10 |
| 46.4 | 1.957 | 7 |
| 47.4 | 1.918 | 17 |
| 49.1 | 1.855 | 9 |
| 50.4 | 1.811 | 6 |
| 51.5 | 1.774 | 10 |
| 52.0 | 1.759 | 7 |
| 53.8 | 1.704 | 7 |
| 55.2 | 1.664 | 7 |

A portion of the LZ-135 composition produced in Example 5 was calcined in air at 500° C. for 2 hours. The X-ray powder diffraction pattern of the calcined product is set forth in Table B, below:

TABLE B

| 2θ | d,A | I/I₀ × 100 |
|---|---|---|
| 5.8 | 15.24 | 36 |
| 6.5 | 13.60 | 10 |
| 8.7 | 10.16 | 28 |
| 9.9 | 8.93 | 10 |
| 11.4 | 7.76 | 98 |
| 12.1 | 7.31 | 29 |
| 13.4 | 6.61 | 44 |
| 14.3 | 6.19 | 47 |
| 15.1 | 5.87 | 19 |
| 15.3 | 5.79 | 21 |
| 16.5 | 5.37 | 3 |
| 16.6 | 5.34 | 3 |
| 18.5 | 4.80 | 3 |
| 19.0 | 4.67 | 3 |
| 19.8 | 4.48 | 2 |
| 20.5 | 4.33 | 19 |
| 20.9 | 4.25 | 7 |
| 21.6 | 4.11 | 7 |
| 20.3 | 3.87 | 47 |
| 23.6 | 3.77 | 100 |
| 24.2 | 3.68 | 60 |
| 24.9 | 3.58 | 42 |
| 26.0 | 3.427 | 32 |
| 26.3 | 3.389 | (SH) |
| 26.8 | 3.326 | 10 |
| 28.5 | 3.132 | 50 |
| 29.1 | 3.069 | (SH) |
| 29.6 | 3.018 | 68 |
| 30.7 | 2.912 | 32 |
| 31.4 | 2.849 | 23 |
| 31.8 | 2.814 | 45 |
| 32.3 | 2.772 | 10 |
| 32.8 | 2.730 | 16 |
| 33.3 | 2.691 | 11 |
| 34.8 | 2.578 | 7 |
| 35.6 | 2.522 | 13 |
| 36.9 | 2.436 | 7 |
| 37.6 | 2.392 | 3 |
| 39.1 | 2.304 | 3 |
| 39.3 | 2.292 | 3 |
| 40.2 | 2.243 | 10 |
| 42.4 | 2.132 | 11 |
| 43.1 | 2.099 | 3 |
| 44.0 | 2.058 | 7 |
| 46.8 | 1.941 | 7 |
| 47.4 | 1.918 | 21 |
| 48.9 | 1.863 | 7 |
| 49.2 | 1.852 | 7 |
| 50.6 | 1.804 | 3 |
| 51.6 | 1.765 | 10 |
| 52.4 | 1.746 | 7 |
| 54.2 | 1.692 | 3 |
| 55.3 | 1.661 | 7 |

EXAMPLE 12

In order to demonstrate the catalytic activity of the LZ-135 composition, a calcined sample of the product of Example 5 was tested for catalytic cracking. The test procedure employed was the catalytic cracking of a premixed two (2) mole % n-butane in helium stream in a ½" O.D. quartz tube reactor over up to about 5 grams (20–40 mesh) of the particular LZ-135 sample to be tested. The sample was activated in situ for 60 minutes at 500° C. under 200 cm³/min dry helium purge. Then the two (2) mole % n-butane in helium at a flow rate of 50 cm³/min was passed over the sample for 40 minutes with product stream analysis being carried out at 10 minute intervals. The pseudo-first-order rate constant ($k_A$) was then calculated to determine the catalytic activity of the LZ-135 composition. The $k_A$ value (cm.³/g min.) obtained for the LZ-135 composition is 0.5.

LZ-135 is useful as a catalyst in hydrocarbon conversion reactions and also the conversion of oxygenated hydrocarbons such as methanol to hydrocarbon species such as olefins. It is also suitable for use as an adsorbent and a desiccant for the general class of aluminosilicate molecular sieves.

What is claimed is:

1. Crystalline aluminosilicate zeolite composition having a chemical composition in the anhydrous state and in terms of mole ratios of oxides:

$$xM_{2/n}O:Al_2O_3:ySiO_2$$

wherein "M" is at least one cation having the valence "n", "x" has a value of from zero to 3.5, and "y" has a value of from 3.5 to 6.5, said aluminosilicate having pore diameters of 4.3A and having an x-ray powder diffraction pattern containing at least the following d-spacings:

TABLE I

| 2θ | d,A | Relative Intensity |
|---|---|---|
| 011.1–11.4 | 7.97–7.76 | M–VS |
| 14.0–14.3 | 6.33–6.19 | M–VS |
| 21.0–21.7 | 4.23–4.10 | VW–VS |
| 23.0–23.6 | 3.87–3.77 | M–VS |
| 23.9–24.3 | 3.72–3.66 | M–VS |
| 31.0–31.4 | 2.849–2.814 | M–VS |

2. Crystalline aluminosilicate zeolite composition according to claim 1 wherein "y" has a value of from 4.0 to 6.0.

3. Crystalline aluminosilicate zeolite composition resulting from the calcination of the composition of claim 1 at a temperature of at least 400° C., said composition having pore diameters of 4.3A and having an X-ray powder diffraction pattern containing at least the following d-spacings:

TABLE II

| 2θ | d(A) | Relative Intensity |
|---|---|---|
| 11.4 | 7.76 | VS |
| 14.3 | 6.19 | M |
| 23.0 | 3.87 | M |
| 23.6 | 3.77 | VS |
| 24.2 | 3.68 | M |
| 29.6 | 3.018 | M |

4. Crystalline aluminosilicate zeolite composition having a chemical composition in the as-synthesized anhydrous state in terms of mole ratios of oxides:

$$aR_2O:bQ_2O:cM_{2/n}O:Al_2O_3:4-6.5SiO_2$$

wherein "a" has a value of from greater than zero to 0.2; "b" has a value of from greater than zero to 0.5; "c" has a value of from zero to 1.0; (a+b) has a value of at least 0.1; "R" represents the tetraethylammonium ion; "Q" represents the tetramethylammonium ion; and "M" represents an alkali or alkaline earth metal ion having the valence of "n", said zeolite having pore diameters of 4.3A and having an x-ray powder diffraction pattern containing at the following d-spacings:

TABLE I

| 2θ | d,A | Relative Intensity |
|---|---|---|
| 11.1–11.4 | 7.97–7.76 | M–VS |
| 14.0–14.3 | 6.33–6.19 | M–VS |

TABLE I-continued

| 2θ | d,A | Relative Intensity |
|---|---|---|
| 21.0–21.7 | 4.23–4.10 | VW-MS |
| 23.0–23.6 | 3.87–3.77 | M-VS |
| 23.9–24.3 | 3.72–3.66 | M-VS |
| 31.0–31.4 | 2.849–2.814 | M-VS |

5. Crystalline aluminosilicate zeolite composition having a chemical composition in the anhydrous state and in terms of mole ratios of oxides:

$$xM_{2/n}O:Al_2O_3:ySiO_2$$

wherein "M" is at least one cation having the valence "n", "x" has a value of from zero to 3.5, and "y" has a value of from 3.5 to 6.5, said aluminosilicate having an X-ray powder diffraction pattern essentially as set forth in Table III.

6. Process for preparing the zeolite composition of claim 4 which comprises forming a reaction mixture having a composition expressed in terms of mole ratios of oxides within the ranges:

$$a\ R_2O:b\ Q_2O:c\ M_{2/n}O:Al_2O_3:d\ SiO_2:e\ H_2O$$

wherein "a" has a value of from 0.1 to 6; "b" has a value of from 0.1 to 6; (a+b) has a value of at least 0.4; "c" has a value of from one to 10; "d" has a value of from 4 to 6; "e" has a value of from 50 to 250; "R" represents the tetraethylammonium ion; "Q" represents the tetramethylammonium ion; and "M" represents an alkali or alkalline earth cation having the valence "n", and maintaining said reaction mixture under autogenous pressure at a temperature of from about 25° C. to 200° C. until crystals of the zeolite composition are formed.

7. Process according to claim 6 wherein "c" has a value of from 4 to 7, "d" has a value of from 4.5 to 5.5, "e" has a value of from 100 to 200, "M" represents sodium, and the temperature at which the reaction mixture is crystallized is from 80° C. to 150° C.

* * * * *